US010965686B1

(12) United States Patent
Agarwwal et al.

(10) Patent No.: US 10,965,686 B1
(45) Date of Patent: Mar. 30, 2021

(54) SYSTEM AND METHOD OF MANAGING PRIVILEGE ESCALATION IN CLOUD COMPUTING ENVIRONMENTS

(71) Applicant: ThreatModeler Software Inc., Jersey City, NJ (US)

(72) Inventors: Anuraag Agarwwal, Jersey City, NJ (US); Irwin Emmanuel Dathala, Bayonne, NJ (US)

(73) Assignee: THREATMODELER SOFTWARE INC., Jersey City, NJ (US)

( * ) Notice: Subject to any disclaimer, the term of this patent is extended or adjusted under 35 U.S.C. 154(b) by 0 days.

(21) Appl. No.: 17/137,884

(22) Filed: Dec. 30, 2020

(51) Int. Cl.
*H04L 29/06* (2006.01)

(52) U.S. Cl.
CPC .......... *H04L 63/105* (2013.01); *H04L 63/102* (2013.01); *H04L 63/1416* (2013.01); *H04L 63/1425* (2013.01)

(58) Field of Classification Search
CPC . H04L 63/105; H04L 63/102; H04L 63/1416; H04L 63/1425
See application file for complete search history.

(56) References Cited

U.S. PATENT DOCUMENTS

| | | | | |
|---|---|---|---|---|
| 10,880,283 | B1 * | 12/2020 | Roth | G06F 21/604 |
| 2008/0104665 | A1 * | 5/2008 | Naldurg | G06F 21/577 |
| | | | | 726/2 |
| 2012/0198557 | A1 * | 8/2012 | Pistoia | G06F 21/577 |
| | | | | 726/25 |
| 2013/0298128 | A1 * | 11/2013 | Russinovich | G06F 9/468 |
| | | | | 718/100 |
| 2016/0248809 | A1 * | 8/2016 | Smith | H04L 63/107 |
| 2018/0248889 | A1 * | 8/2018 | Deninno | H04L 63/105 |
| 2019/0253427 | A1 * | 8/2019 | Kling | G06F 21/6218 |

* cited by examiner

*Primary Examiner* — Shin-Hon (Eric) Chen
(74) *Attorney, Agent, or Firm* — Rossi, Kimms & McDowell LLP

(57) ABSTRACT

Systems and methods of identifying over-privileged access in a computing system are disclosed. The method includes receiving configuration information for the computing system, selecting an identity that can access the computing system and determining access privileges for the selected identity using at least the received configuration information, the access privileges identifying one or more computing resource or service accessible to the selected identity, determining at least one role assumable by the identified one or more computing resource or service accessible to the selected identity, and determining whether the identified one or more computing resource or service accessible to the selected identity can elevate its privileges. In a case where it is determined that the identified one or more computing resource or service accessible to the selected identity can elevate its privileges, the method provides notification that the identity has over-privileged access to the computing system.

11 Claims, 9 Drawing Sheets

Privileges required to elevate access on compute service

For existing ec2 instances which has no IAM role attached and a new IAM role to be attached, following permissions set is required > "iam:PassRole",
> "ec2:DescribeInstances",
> "iam:ListInstanceProfiles",
> "ec2:AssociateIamInstanceProfile", If existing ec2 instances which has an IAM role attached and to replace that IAM role, following permissions set is required > "iam:PassRole",
> "ec2:DescribeInstances",
> "ec2:DescribeIamInstanceProfileAssociations",
> "iam:ListInstanceProfiles",
> "ec2:ReplaceIamInstanceProfileAssociation"

If new ec2 instances needs to have an IAM role attached (while launching ec2), following permissions set is required > "iam:PassRole",
> "iam:ListInstanceProfiles",
> "ec2:AssociateIamInstanceProfile"

From CLI, if new ec2 instances needs to have an IAM role attached (while launching ec2), following permissions set is required > "iam:PassRole",
> "ec2:RunInstances",
> "ec2:AssociateIamInstanceProfile"

FIG. 8

SYSTEM AND METHOD OF MANAGING PRIVILEGE ESCALATION IN CLOUD COMPUTING ENVIRONMENTS

TECHNICAL FIELD

Aspects of this disclosure generally are related to identifying and managing privilege escalation in identity and access management systems for complex computing environments.

BACKGROUND

Identity and access management (IAM), which may also be referred to as identity management (IdM) or access and identity management (AIM), refers to the processes, technologies, and policies for managing digital identities and controlling how those identities can be used to access resources in a computing environment. Generally, IAM responsibilities rest with service providers who manage the computing environment. However, in a "cloud computing" environment, IAM responsibilities may be shared between the cloud service providers and the users (or customers) of the cloud service.

In this shared responsibility model, cloud service providers (CSPs) are generally responsible for protecting the cloud infrastructure but the protection of applications and data hosted in the cloud is generally the customer's responsibility. However, cloud service providers can take measures to protect customer data—such as encrypting data and deploying a web application firewall. Cloud infrastructure entitlement management describes solutions for managing access and enforcing least privilege in the cloud, enabling customers to establish who can use their data and how.

Access rights to various computing resources may need to be added, removed, or modified when users join or leave a user entity or change roles within that entity. Often, access is managed by giving a user the least privilege in the cloud to fulfill their assigned roles and meet their data or application needs. However, the number of entitlements across cloud infrastructure is growing in size and complexity as more CSP offerings and services are added. Thus, it is impossible for conventional IAM techniques to keep pace with this growth and, therefore, manual methods for determining least privilege access are neither feasible in nor scalable to cloud computing environments.

A second aspect of IAM is privilege escalation. Privilege escalation refers to the act of exploiting a bug, design flaw, or configuration oversight in an operating system or software application to gain elevated access to resources that are normally protected from an application or user. In the context of a cloud computing environment, privilege escalation maybe vertical or horizontal. In vertical privilege escalation, a user with lower privileges attempts to access a resource that needs higher privileges. In horizontal escalation, a user attempts to access other resources (than those explicitly authorized) that require the same level of privilege. While horizontal privilege escalation may not seem to be harmful at first glance, it can act as a pathway for a malicious user to exploit vertical escalation. Both of these types of privileges escalation may be considered examples of over privileged access.

Conventional solutions for detection of over privileged access generally focus on vertical privilege escalation but do not fully understand, or mitigate, the threat posed by horizontal privileged escalation. For example, Ermetic Ltd. (https://ermetic.com/) provides solutions for mitigating access risk and enforcing least privilege in the cloud by providing a representation of what services a user can access in the cloud infrastructure. Ermetic's model determines the policies that are attached to the user based on their assigned privileges, and which computing resources can be accessed by these policies. However, Ermetic's model is unable to detect horizontal escalation based on the assigned privileges and, therefore, may not identity vertical privilege escalation threats that result from the horizontal privilege escalation.

CloudKnox (https://cloudknox.io/) provides a cloud permission management platform that can discover, manage, monitor, and report various threats related to the identities and resources. CloudKnox can discover and assess the risk of identities and resources based on a defined metric. In CloudKnox, users can also manage and protect the infrastructure by removing unused or high-risk policies. Finally, CloudKnox provides continuous monitoring, incident response, and forensics. However, similar to Ermetic's model, CloudKnox is unable to detect horizontal escalation based on the assigned privileges and, therefore, may not identity vertical privilege escalation threats that result from the horizontal privilege escalation.

Continuous (or periodic) reviews of privileges and policies ensure that access rights for users do not exceed the intended scope of their authority. Users should be able to access only those resources necessary to perform their job duties. Moreover, it may also be important to ensure that users are not provided with incompatible access rights—combinations of access rights that would allow them to carry out tasks incompatible with their job duties.

As access reviews may involve hundreds of thousands of access rights, reviewing such a large volume of access rights on a regular basis may strain the available resources of that organization. Further, there may be additional risks posed by vertical privilege escalation that is enabled by horizontal privilege escalation, Therefore, there exists a need exists for improved identity and access management techniques that continually detect privilege escalation threats posed by both vertical and horizontal privilege escalation in a cloud computing environment.

SUMMARY

Some embodiments of the present invention pertain to methods, systems, and non-transitory computer readable storage media that store programs for perform a processor-executable method of identifying over-privileged access in a computing system.

In some embodiments of the invention, the method of identifying over-privileged access in a computing system comprises receiving configuration information for the computing system; selecting an identity that can access the computing system and determining access privileges for the selected identity using at least the received configuration information, the access privileges identifying one or more computing resource or service accessible to the selected identity; determining at least one role assumable by the identified one or more computing resource or service accessible to the selected identity; determining whether the identified one or more computing resource or service accessible to the selected identity can elevate its privileges by (a) adding a new role assumable by the identified one or more computing resource or service, or (b) modifying the determined at least one role to access an additional resource or service, or both (a) and (b); and, in a case where it is determined that the identified one or more computing resource or service accessible to the selected identity can elevate its privileges, providing notification that the identity has over-privileged access to the computing system.

In some embodiments of the invention, the computing system is a cloud computing system.

In some embodiments of the invention, the configuration information includes at least one of access privileges for one or more identities that can access the computing system, and information on roles that can be assumed by the computing resource or service.

In some embodiments of the invention, the identity includes a role, a user, or a group.

In some embodiments of the invention, the selected identity can elevate its privileges by adding a new role assumable by the identified one or more computing resource or service based on the access privileges for the selected identity or configuration information associated with the identified one or more computing resource or service.

In some embodiments of the invention, the selected identity can elevate its privileges by modifying the determined at least one role to access an additional resource or service based on the access privileges for the selected identity or configuration information associated with the identified one or more computing resource or service.

In some embodiments of the invention, the notification includes information on the new role assumable by the identified one or more computing resource or service, or the additional resource or service not accessible by the selected identity based on its access privileges.

In some embodiments of the invention, an identity and access management system that identifies over-privileged access in a computing system comprises at least one memory configured to store instructions, and at least one processor communicatively connected to the at least one memory and configured to execute the stored instructions to receive configuration information for the computing system; select an identity that can access the computing system and determine access privileges for the selected identity using at least the received configuration information, the access privileges identifying one or more computing resource or service accessible to the selected identity; determine at least one role assumable by the identified one or more computing resource or service accessible to the selected identity; determine whether the identified one or more computing resource or service accessible to the selected identity can elevate its privileges by (a) adding a new role assumable by the identified one or more computing resource or service, or (b) modifying the determined at least one role to access an additional resource or service, or both (a) and (b); and, in a case where it is determined that the identified one or more computing resource or service accessible to the selected identity can elevate its privileges, provide notification that the identity has over-privileged access to the computing system.

In some embodiments of the invention, a non-transitory computer readable storage medium stores a program executable by a processor to perform the method of identifying over-privileged access in a computing system.

BRIEF DESCRIPTION OF THE DRAWINGS

It is to be understood that the attached drawings are for purposes of illustrating aspects of various embodiments and may include elements that are not to scale. It is noted that like reference characters in different figures refer to the same objects.

FIG. 8 shows examples of privileges required to escalate access for some exemplar roles in the identity and access management system, according to some embodiments of the present invention.

DETAILED DESCRIPTION

Figure 1:
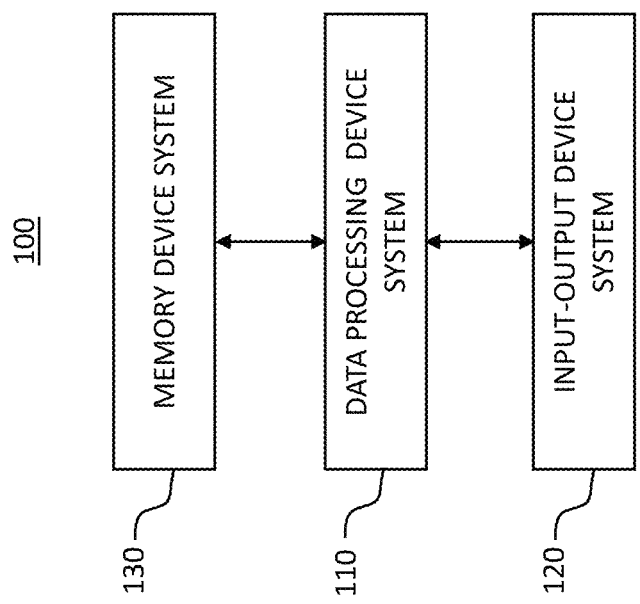
FIG. 1 shows a computing device system, according to embodiments of the invention.

In some embodiments, an access and identity management system provides easy-to-understand guidance for managing access privileges for a large number of users in a complex cloud computing environment. It should be noted that the invention is not limited to these or any other examples provided herein, which are referred to for purposes of illustration only.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present invention may be implemented at least in part by a data processing device system configured by a software program. Such a program may equivalently be implemented as multiple programs, and some or all of such software program(s) may be equivalently constructed in hardware.

Further, the phrase "at least" is or may be used herein at times merely to emphasize the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

Further, the phrase "in response to" may be used in this disclosure. For example, this phrase may be used in the following context, where an event A occurs in response to the occurrence of an event B. In this regard, such phrase includes, for example, that at least the occurrence of the event B causes or triggers the event A.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted to include one or more programs including as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 251, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. However, non-usage of the phrase "or a derivative thereof" or the like nonetheless includes derivatives or modifications of information or data just as usage of such a phrase does, as such a phrase, when used, is merely used for emphasis.

Further, the phrase "graphical representation" used herein is intended to include a visual representation presented via a display device system and may include computer-generated text, graphics, animations, or one or more combinations thereof, which may include one or more visual representations originally generated, at least in part, by an image-capture device.

Figure 9:
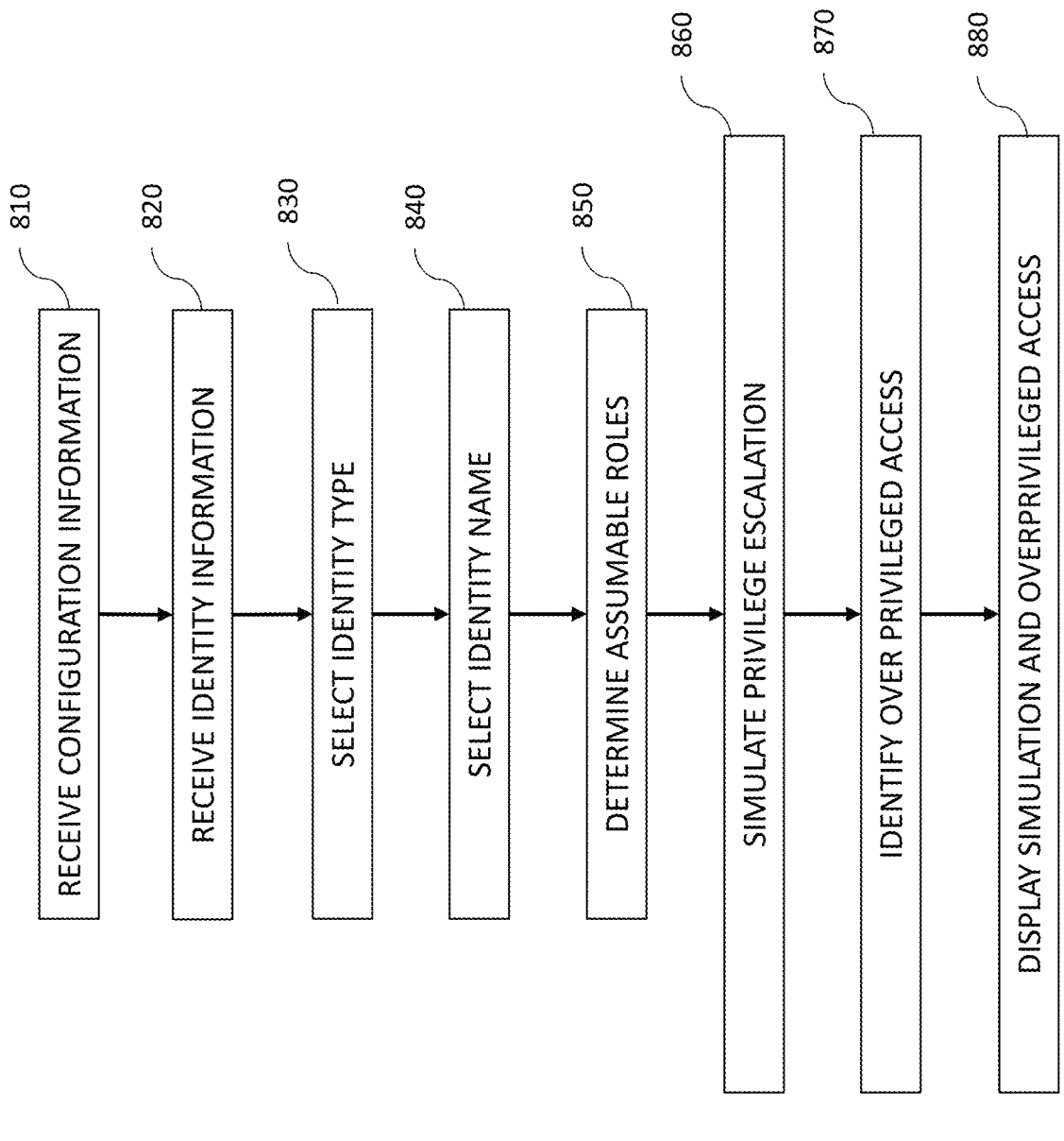
FIG. 9 is a flowchart showing a method of determining privilege escalation, according to some embodiments of the present invention.

Further still, example methods are described herein with respect to FIG. 9. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIG. 9 herein is not limited to an actual structure of any program or set of instructions or required ordering of method tasks, and such method FIG. 9, according to some embodiments, merely illustrates the tasks that instructions are configured to perform, for example upon execution by a data processing device system in conjunction with interactions with one or more other devices or device systems.

Figure 2:
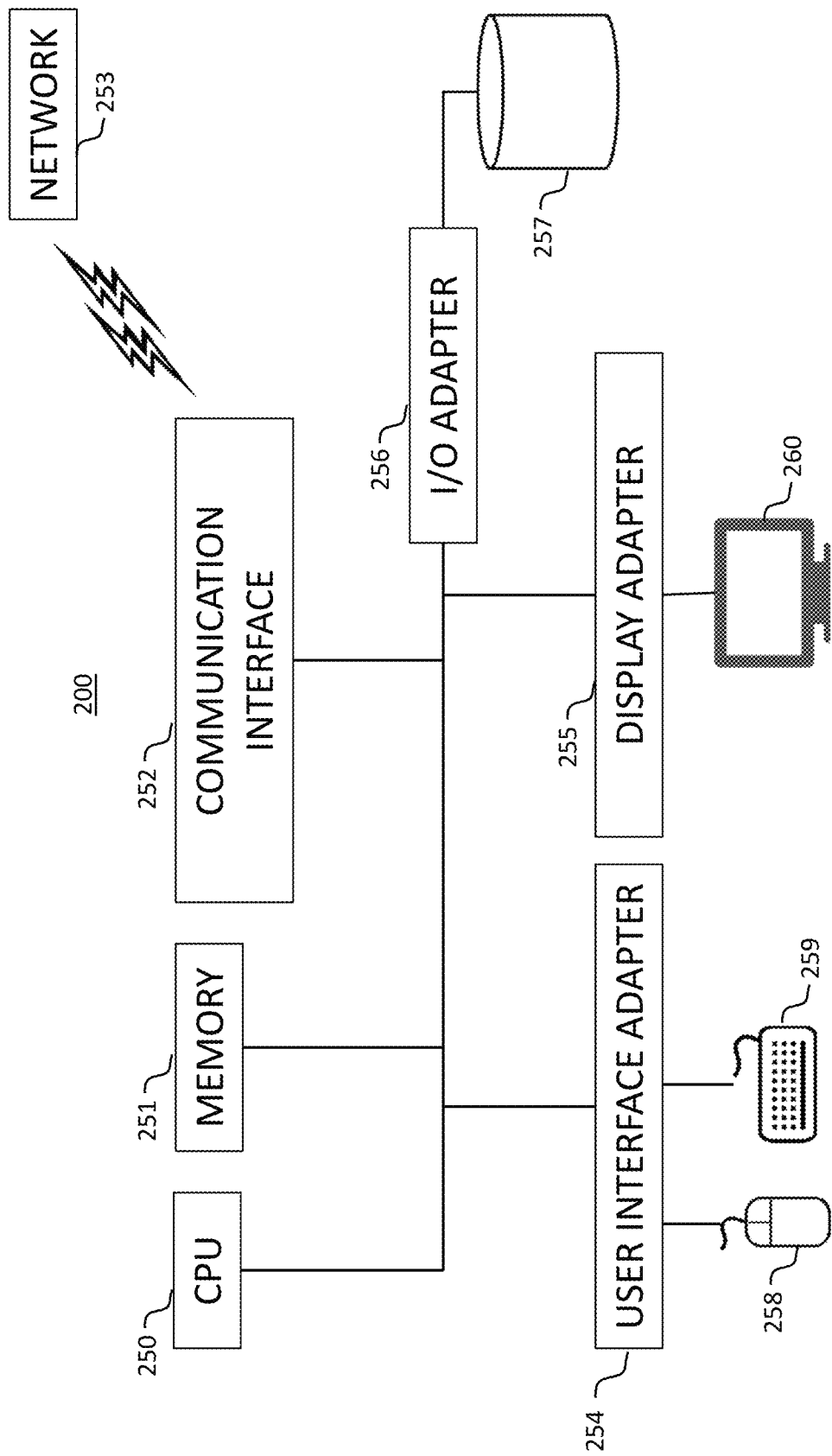
FIG. 2 shows another computing device system, according to embodiments of the invention.

FIG. 1 schematically illustrates a system 100 according to some embodiments. In some embodiments, the system 100 may be a computing device 200 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 200, according to some embodiments. The computing device system 200 may include a processor 250, corresponding to the data processing device system 110 of FIG. 1, in some embodiments. The memory 251, input/output (I/O) adapter 256, and non-transitory storage medium 257 may correspond to the memory device system 130 of FIG. 1, according to some embodiments. The user interface adapter 254, mouse 258, keyboard 259, display adapter 255, and display 260 may correspond to the input-output device system 120 of FIG. 1, according to some embodiments. The computing device 200 may also include a communication interface 252 that connects to a network 253 for communicating with other computing devices 100.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms.

FIG. 9 includes a flowchart, which may implement various embodiments of method 800 by way of associated computer-executable instructions according to some example embodiments. In various example embodiments, a memory device system (e.g., memory device system 130) is communicatively connected to a data processing device system (e.g., data processing device systems 110, otherwise stated herein as "e.g., 110") and stores a program executable by the data processing device system to cause the data processing device system to execute various embodiments of method 800 via interaction with at least, for example, various databases 350, 370, 380 shown in FIG. 3. In these various embodiments, the program may include instructions configured to perform, or cause to be performed, various ones of the instructions associated with execution of various embodiments of method 800. In some embodiments, method 800 may include a subset of the associated blocks or additional blocks than those shown in FIG. 9. In some embodiments, method 800 may include a different sequence indicated between various ones of the associated blocks shown in FIG. 9.

Figure 3:
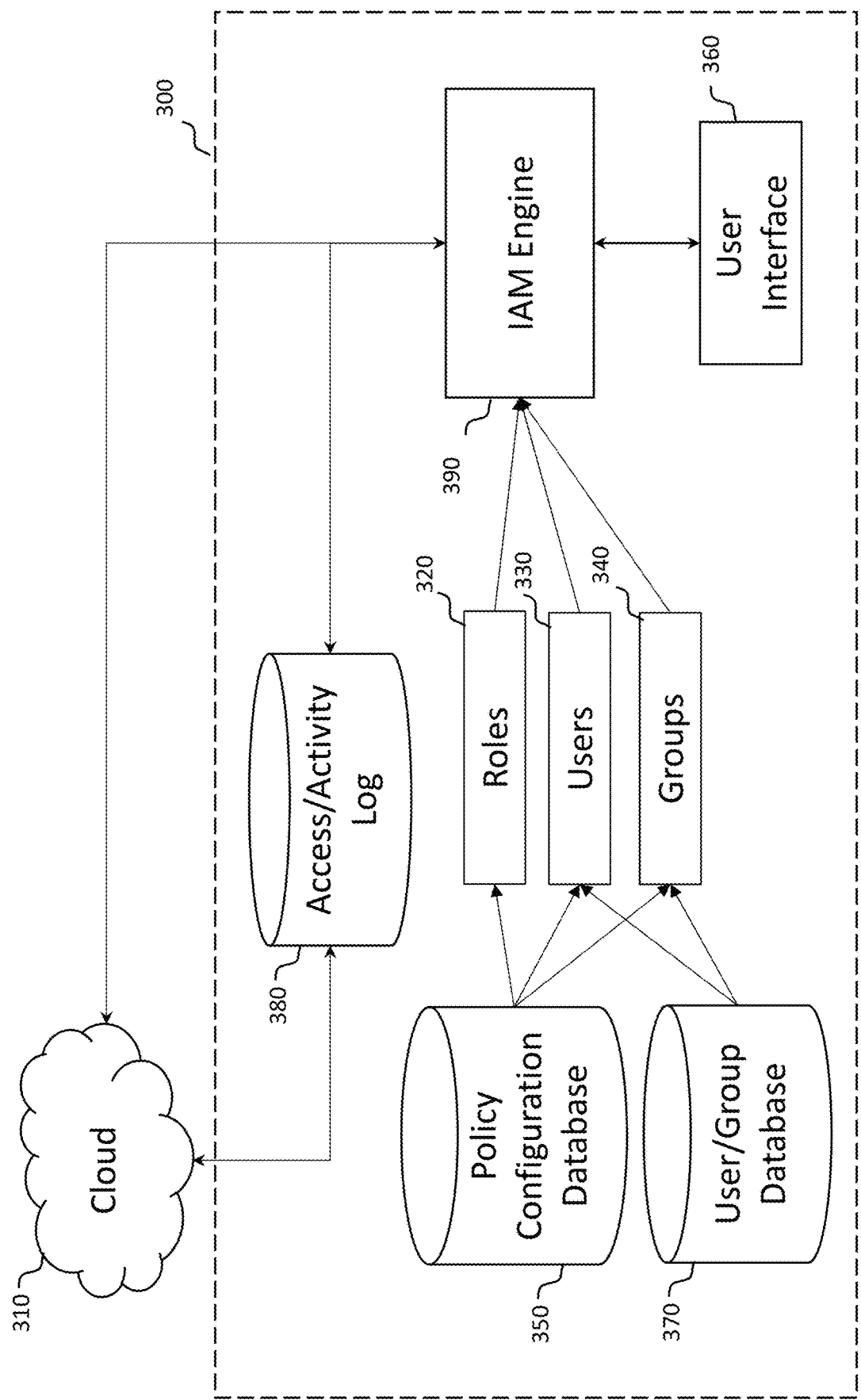
FIG. 3 shows an architecture for an identity and access management system, according to some embodiments of the present invention.

According to some embodiments of the present invention, the system 100 includes some or all of the identity and access management (IAM) system 300 shown in FIG. 3, or vice versa. In this regard, FIG. 3 illustrates a system 300, according to some embodiments of the present invention. The IAM system 300, may be a particular implementation of the system 100 or the computing device 200, according to some embodiments. The IAM system 300 may include one or more databases 350, 370, 380. A user 330 may access the identity and access management system 300 using one or more end-user devices 231, 232, 233 included in user interface 360. The end-user devices 231, 232, 233 include, for example, computers such as laptop, notebook, or desktop computers, or mobile devices such as cellular phones and tablets. The end-user devices 231, 232, 233 connect to a server 210 via a wired or a wireless network 253. In some embodiments, the IAM system 300 includes an IAM Engine 390 that executes a program or set of instructions to perform the functions provided by the IAM system 300. In some embodiments, the IAM Engine 390 determines privileges and access rights for roles 320, users 330, and groups 340 based on information contains in a policy configuration database 350 and user/group database 370.

In some embodiments, the users 330 may be human users or machine users. In some embodiments, the users 330 may assume one or more roles 320. In some embodiments, the users may be grouped into groups 340. In some embodiments, the IAM engine 390 includes one or more of a memory device system 130, data processing device system 110, and input-output device system 120 to execute the functions of the identity and access management system 300.

In some embodiments of the invention, the IAM system 300 protects a cloud computing environment 310 by managing privileges and access rights of users 330, user groups 340, and roles 320 authorized to interact with the cloud computing environment 310. In some embodiments of the invention, the IAM system 300 may be connected to a configuration database 350 or a user database 370. In some embodiments of the invention, the IAM system 300 may include or be connected to a user interface 360. The cloud computing environment 310 may include one or more services or resources provided by one or more cloud service providers. One or more roles, users and groups 320, 330, 340 may be authorized to access the one or more services or resources provided in the cloud computing environment 310. The one or more users 330 may include human users or digital entities, each of which can assume one or more roles 320 in the system during different interactions with the cloud computing environment 310.

For sake of simplicity, the term "user" in this application includes roles 320, users 330, and groups 340. A user must go through the steps of identification, authentication, and authorization in order to gain any level of access to a resource or service in the cloud computing environment 310. Identification refers to the claim or assertion that the user (whether a human or a machine) is a known user of the IAM system 300. Authentication refers to the verification of the identification claim, the most well-known example being login credentials. The authorization process determines the level of granted access to the cloud computing environment 310 for the authenticated user. In some embodiments of the invention, the identification, authentication, and authorization information for each user 320, 330, 340 may be stored in the user database 370 and the privilege code will be stored in the configuration database 350. In some embodiments of the invention, a user access and activity database 380 may also store an activity log of each user's interactions with the cloud computing environment 310. The activity log may include the identity of each resource or service utilized by the user, the frequency of utilization, and the access rights or privileges asserted for each interaction.

Identity and access management systems utilize a framework with a well-defined set of policies that ensure only the right users in an enterprise are provided with the correct access to the resources and services provided by the cloud computing environment 310, and is one of the key security factors for data management and IT security. Identity and access management not only authenticates a human user to machine communication but can also authenticate machine to machine communication. In the context of a cloud computing environment 310, the identity and access management system 300 may include three categories of configuration—roles 320, users 330, and groups 340.

In some embodiments of the invention, an IAM role 320 may be similar to an IAM user 330 in that the IAM role is an identity with permission policies that determine what the identity can and cannot do in the cloud computing environment 310. However, instead of being uniquely associated with one user, the IAM role is intended to be assumable by any user who needs it (human or machine). Thus, the IAM role defines a set of access privileges granted to a user assuming that role in the cloud computing environment 310. In some embodiments of the invention, an IAM role may be assumed by more than one user. In some embodiments of the invention, a user may assume more than one IAM role. Generally, an IAM role does not have standard long-term credentials such as a password or access keys associated with it. Instead, when an IAM user assumes an IAM role, the IAM system 300 provides an authenticated user with the appropriate security credentials or authorizations for that role session.

In the cloud, identities, policies, and actions need to be brought together contextually to determine the net-effective level of access a user 330 (human or machine) or role 320 can obtain. A standard user can be assigned permissions directly, they can join a group that determines their permissions, or they can assume a temporary role that is granted specific permissions. Those permissions are established inside the policies. These policies are code snippets which dictate the principal, action, resource, and conditions of this access. There could be thousands of role-policy combinations and thousands of actions that could be taken on an asset (resource or service) in the cloud computing environment 310.

In some embodiments, the configuration database 350 defines the privileges and access rights associated with various roles, users, or groups in the cloud computing environment 310. In some embodiments of the invention, the IAM system 300 uses the configuration database 350 to define the appropriate authorization for each user session in the cloud computing environment 310.

In some embodiments of the invention, the IAM system 300 may determine whether a user or role is over privileged based at least one the information included in the configuration database 350 and the user database 370.

Privilege escalation is defined as the exploitation of a bug or flaw that allows for a higher privilege level than what would normally be permitted for a user. Privilege escalation permits an attacker to exploit a bug or a flaw in an operating system, application, or system configuration to acquire higher privileges to a resource or service in the cloud computing environment 310. In the most extreme instances, a malicious user can get an administrator or root-level access to the cloud computing environment 310. There are two types of privilege escalation, vertical escalation and horizontal escalation.

In vertical escalation (also known as privilege elevation), a user with lower privileges is able to access a resource or service that needs higher privileges than those authorized for the user. In horizontal privilege escalation (also known as lateral privilege escalation), a user is able to access other resources than those authorized for the assumed role for that user session, requiring the same level of privileges. While, at first, horizontal privilege escalation may not seem to be harmful, it can provide a pathway for a malicious user to exploit vertical escalation.

Over privileged access to an identity (such as an authenticated and authorized user session) occurs when that identity either has access to resources or services that are above their authorized privilege level or has access to excessive resources or services on the same privilege level. Generally, the latter is observed more frequently in IAM systems. By exploiting lateral privilege escalation, a malicious user can find ways to vertically escalate their privileges using other configurations and roles. Hence, identifying and mitigating horizontal privilege escalation is extremely important to ensure a secure and protected IAM system.

In some embodiments of the invention, the IAM system 300 automatically identifies over privileged identities and mitigates both vertical and horizontal privilege escalation. In some embodiments of the invention, a user interface 360 permits a manager or administrator of the IAM system 300 to interact with the IAM system. In some embodiments of the invention, the user interface 360 includes a input-output devices to permit such interaction. In some embodiments of the invention, the user interface 360 includes a display unit 260 that displays various screens, such as the exemplar screens shown in FIGS. 4 and 6.

Figure 4:
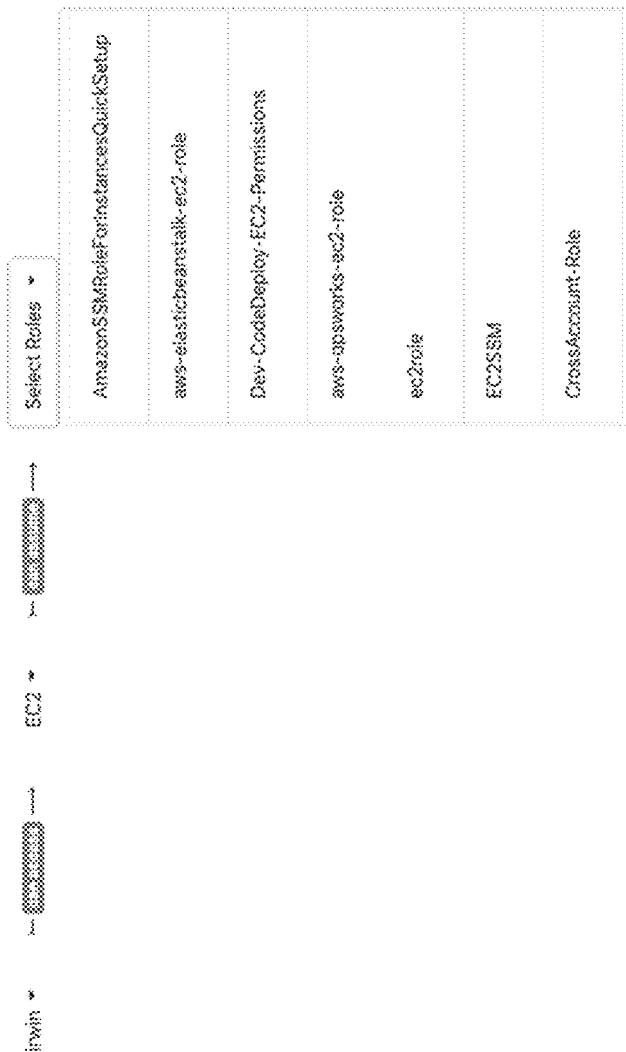
FIG. 4 shows an exemplar user interface screen of the identity and access management system, according to some embodiments of the present invention.
Figure 5:
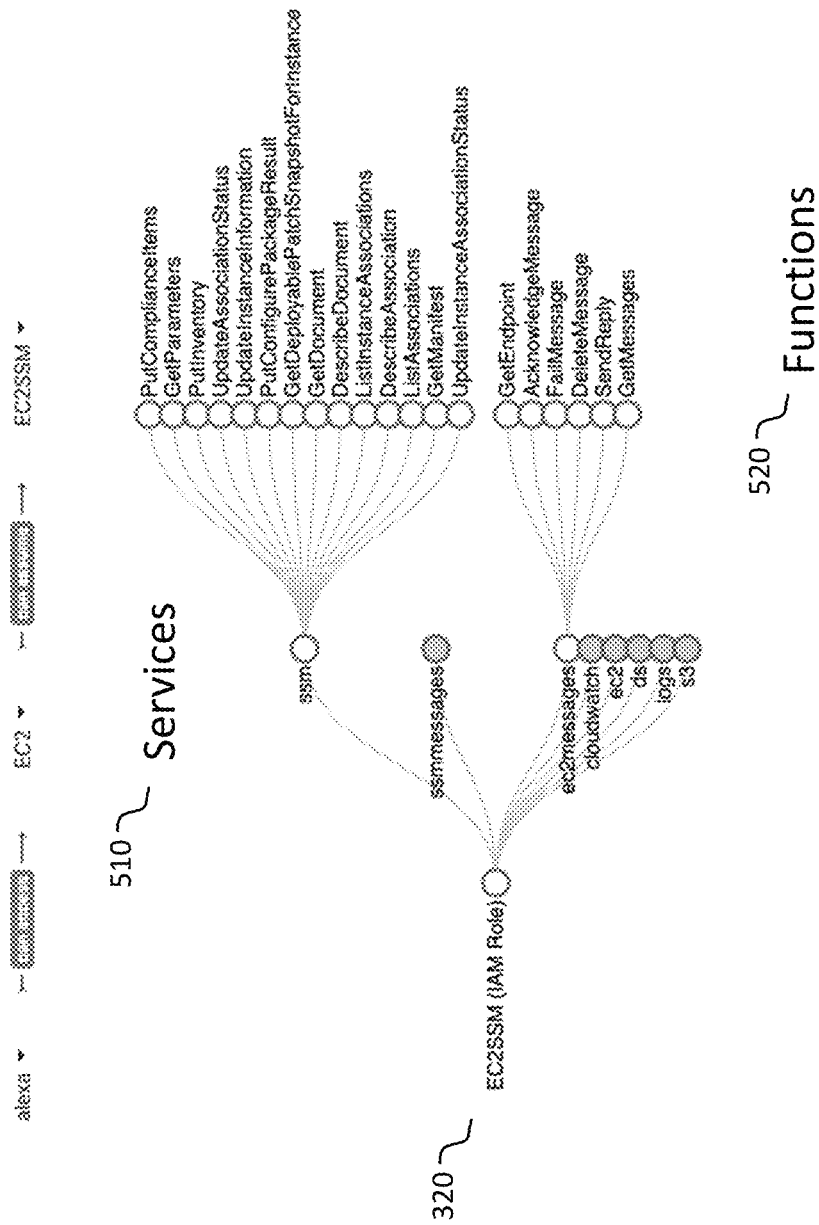
FIG. 5 shows a set of services and functions accessible for an exemplar role in the identity and access management system, according to some embodiments of the present invention.
Figure 6:
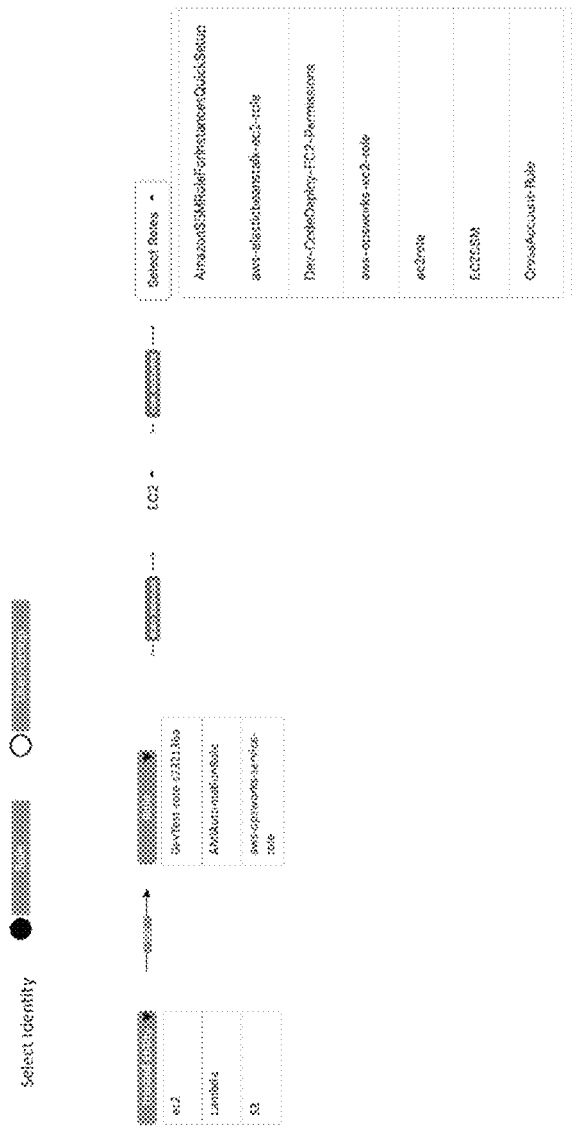
FIG. 6 shows another exemplar user interface screen of the identity and access management system, according to some embodiments of the present invention.

FIGS. 4 and 6 show exemplar user interactions in an AWS (Amazon Warehouse System) cloud environment, as an example of the IAM system 300. The AWS cloud environment may include various computing resources (such as EC2 and Lambda) that can access other resources. If a user (for example "Irwin" in FIG. 4) has access to a particular computing resource (for example "EC2" in FIG. 4), and that computing resource has access to another resource (such as S3) through another role (for example "EC2SSM" in FIGS. 4 and 5), a user authorized to access only the EC2 resource may nevertheless be able to access S3 buckets by also assuming the EC2SSM role. The EC2 computing resource will have a role attached to it, which will allow the EC2 computing resource to talk to another resource (the S3 bucket in this example). In other words, a malicious user can assume the role of the EC2 computing resource to then access the S3 bucket. If the user has access privileges to modify the role that is attached to a computing resource and add another role to it, then the user can give themselves access to multiple services and perform malicious actions.

FIG. 6 shows an example screens where an entity may be a user/group or a role. If the selected identity type is either U (user) or G (group), then the next selection is made from the list of IAM users or IAM groups. If the selected identity type is R (role), then the system first determines whether there are multiple trusted entities and selects one of the trusted entities. Next, the system selects a role that can be assumed by the selected trusted entity from the list of IAM Roles. Each IAM role can access a set of resources or services in the cloud computing environment 310. Each selected resource, however, may be able to assume another role, depending on user privileges, giving the selected trusted entity access to additional resources.

FIG. 9 shows a flowchart of a method 800 of identifying and mitigating privilege escalation in an IAM system, according to some embodiments of the invention. In step 810, configuration information from the configuration database 350 is received. In step 820, identity information from the roles 320, users 330, groups 340 and received. The IAM system 300 uses the configuration information and the identity information to determine various users, groups, and roles that can be assumed by an entity (human or machine) to interact with the cloud computing environment 310.

In step 830, the type of identity (user/group or role) to be simulated is selected. Based on the selected type of identity, as shown in FIG. 4, a particular user (for example, "Irwin") may be selected in step 840 for simulation. In step 850, the other identities/roles assumable by the selected user/group or selected role are determined. For example, as shown in FIG. 4, if the selected role for simulation is "irwin accessing EC2", the IAM system 300 determines additional roles that can be assumed by an identity (the user "irwin") that has access to the EC2 resource. For each additional role that can be assumed by a selected resource for a user, additional services or functions that may be accessible to the user are identified. For example, FIG. 5 shows a simulations of additional resources (services and functions) that can be accessed by "Irwin" if he can elevate the privileges he has to the EC2 resource to assume the EC2SSM role.

Continuing with the description of method 800, in step 860, the IAM system 300 performs a full simulation of all possible access and privileges that can be asserted by the selected identity in the cloud computing environment 300. The IAM system simulates both horizontal and vertical privilege escalation to determine various what-if scenarios for the selected identity (R/U/G) based on the other assumable roles.

As shown in FIG. 5, in some embodiments of the invention, any identity can assume access to other identities by way of immediate access to over-privileged services. In some embodiments of the invention, a user inputs the User or Group information, along with any Computing service that the User/Group can access. In the example shown in FIG. 5, the User/Group is selected as 'alexa' and Computing service is selected as "EC2". The IAM system 300 identifies a list of assumable roles by the "EC2" computing service and one of the roles is selected, for example the "EC2SSM" role. Once all the user inputs are identified, the IAM system 300 generates a representation of the assumed role ("EC2SSM") along with a traversal map of all services 510 that the "EC2SSM" role can access and any functions 520 that the services 510 can perform. In FIG. 5, for example, the "EC2SSM" role can access the following services 510: ssm, ssmmessages, ec2messages, cloudwatch, ec2, ds, logs, and s3. Further, for each of the services 510, FIG. 5 also shows the relevant functions 520 that these services can perform. For example, the "EC2SSM" Role can access the service "ssm" and perform the functions PutComplianceItems, GetParameters, PutInventory, UpdateAssociationStatus, UpdateInstanceInformation, PutConfigurePackageResult, GetDeployablePatchSnapshotForinstance, GetDocument, DescribeDocument, ListAssociations, GetManifest, UpdateInstanceAssociationStatus. Similarly, the "EC2SSM" Role can access the service "ec2messages" and perform the GetEndpoint, AcknowledgeMessage, FailMessage, DeleteMessage, SendReply, GetMessages functions.

Although the selected user or group "alexa" may not have permission to access the services ssm, ssmmessages, ec2messages, cloudwatch, ec2, ds, logs or s3 directly, by virtue of having access to the computing service EC2, "alexa" can now assume an elevated privilege and perform actions outside of the purview of "alexa's" initially defined permissions.

Figure 7:
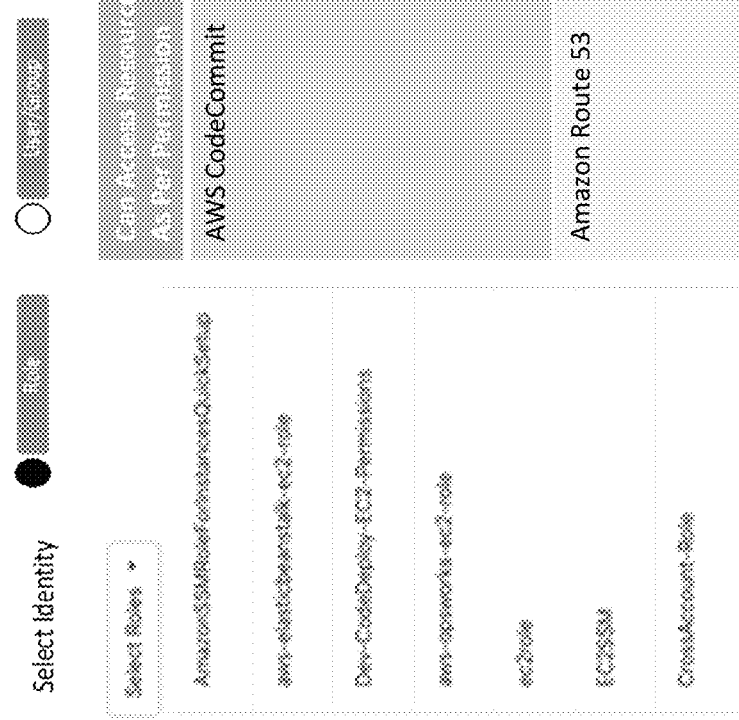
FIG. 7 shows examples of privilege escalation possible for some exemplar roles in the identity and access management system, according to some embodiments of the present invention.

FIG. 7 shows a system representation of how privileges of any selected identity can be elevated due to over-privileged access permissions of one of the services the identity can access, according to some embodiments of the invention. After a specific identity (role or user/group) is selected, a drop-down list of all roles (or users/groups) stored in the policy configuration database 350 and the user/group database 370 is generated. The IAM system 300 further generates a list of resources that the selected identity can access, as shown under "Can Access Resources As Per Permission" column in FIG. 7. The IAM system 300 also generates a list of relevant actions each resource listed in the "Can Access Resources As Per Permission" column can perform, as shown in under "Can Perform Actions" column in FIG. 7.

In the example shown in FIG. 7, a selected identity, in this case a role, can assume the list of roles AmazonSSMRoleForInstancesQuickSetup, aws-elasticbeanstalk-ec2-role, Dev-CodeDeploy-EC2-Permissions, aws-opsworks-ec2-role, ec2role, EC2SSM, and CrossAccount-Role. Once a role is selected, the user can view all the resources that the selected role can access based on the permissions provided to the role. In the example shown in FIG. 7, these resources are AWS CodeCommit, Amazon Route 53 and EC2 (as seen under the "Can Access Resources As Per Permissions" column). Further, a list of actions is provided for each resource under the "Can Perform Actions" column, reflecting the permissible actions the selected role can perform on the given resource. For example, for AWS CodeCommit resource, the selected role can perform CreateBranch, CreateCommi, CreatePullReques, CreatePullRequestApprovalRule, CreateRepository, CreateUnreferencedMergeCommit, DeleteApprovalRuleTemplate, DeleteBranch, DeleteCommentContent, DeleteFile, DeletePullRequestApprovalRule, DeleteRepository, Di sassociateApprovalRuleTemplateFromRepository, GitPush [permission only], PostCommentForPullRequest, and PostCommentReply actions. Similarly, on Amazon Route 53 resource, the selected role can perform AssociateVPCWithHostedZone, ChangeResourceRecordSets, CreateHealthCheck, CreateHostedZone, CreateQueryLoggingConfig, CreateReusableDelegationSet, and CreateTrafficPolicy actions; and on EC2, the selected role can perform ec2:DescribeImages, iam:PassRole, ec2:DescribeVpcs, ec2:RunInstances, ec2:DescribeSubnets, ec2:DescribeKeyPairs, iam:ListInstanceProfiles, ec2:AssociateIamInstanceProfile, and ec2:DescribeSecurityGroups actions.

Further, for any computing resource that can be accessed by the selected identity, referred to as EC2 in the above-mentioned example, the IAM system 300 represents how the selected identity can elevate privileges due to permissions provided to the accessible resources by modifying the privileges of roles attached to the computing service. For example, the selected identity can access EC2 to perform one or more actions to modify privileges of roles inherent to the EC2 and gain elevated access to S3 or Amazon Sagemaker (or any other service accessible by EC2) by performing iam:PassRole or iam:ListInstanceProfiles actions on the roles that EC2 can assume. Therefore, due to elevated privileges, and provided EC2 has role(s) that can access S3, Amazon SageMaker and/or any other resource, EC2 can now perform actions outside of the purview of the permissions initially defined for roles inherent to EC2. For example, the selected identity can access EC2 and perform GetObject, GetObjectAcl, GetObjectLegalHold, GetObjectRetention, GetObjectTagging, GetObjectTorrent, GetObjectVersion, GetObjectVersionAcl, GetObjectVersionForReplication, ListAllMyBuckets, ListBucket, DeleteObjectTagging, DeleteObjectVersionTagging, PutBucketTagging, PutObjectTagging actions on S3 resource and StartMonitoringSchedule, StartHumanLoop, DisassociateTrialComponent, DeleteWorkteam, DeleteUserProfile, DeleteTrialComponent, DeleteTrial, DeleteNotebookInstanceLifecycleConfig, DeleteNotebookInstance, DeleteMonitoringSchedule, DeleteModelPackage, DeleteModel, DeleteHumanLoop, DeleteFlowDefinition, DeleteExperiment, DeleteEndpointConfig, DeleteEndpoint, DeleteDomain, DeleteCodeRepository, DeleteApp actions on Amazon Sagemaker resource by using the iam:PassRole or iam:ListInstanceProfiles actions to modify privileges on roles inherent to EC2.

FIG. 8 shows a representative set of privileges which are required to elevate access on a computing service, according to some embodiments of the invention. In some embodiments of the invention, the policy configuration database 350 includes permissions or actions, if associated to a computing resource, that allow a computing resource to be able to elevate its privileges on any other service that the selected computing service can access. Therefore, in some embodiments of the invention, an existing computing service, for example ec2, with no role attached, can attach a role by using permissions associated with the "iam:PassRole", "ec2:DescribeInstances", "iam:ListInstanceProfiles", or "ec2:AssociateIamInstanceProfile" actions (if available through the permissions). Similarly, in some embodiments of the invention, an existing computing service, example ec2 can replace an existing role through "ec2:ReplaceIamInstanceProfileAssociation", "iam:ListInstanceProfiles", "ec2:DescribeIamInstanceProfileAssociations", "ec2:DescribeInstances", "iam:PassRole" actions (if available through the permissions). In some embodiments of the invention, a new computing service, for example a new ec2, can be launched with built in role(s) by using "iam:PassRole", "iam:ListInstanceProfiles". "ec2:AssociateIamInstanceProfile" actions (if available through the permissions). In some embodiments of the invention, a new computing service, for example a new ec2, can be launched with built in role(s) through a Command Line Injection (CLI) by using "iam:PassRole", "ec2:RunInstances", "ec2:AssociateIamInstanceProfile" actions (if available through the permissions).

Returning now to method 800 shown in FIG. 9, in step 870, the IAM system 300 identifies possible over privileged access scenarios based on the simulated privilege escalation. In some embodiments of the invention, the over privileged access is identified, at least by, determining what roles the selected identity can assume, what computing resources and services are accessible using the assumable roles, and whether the selected identity can modify the roles attached to accessible computing resources or services to elevate their access privileges. For example, as shown in FIG. 5, the IAM system generates also possible pathways (scenarios) to show what computing resources or services can be accessed using the EC2 resource and assuming the EC2SSM role and what actions are permitted (even though they are not authorized) for each accessible computing resource or service.

In step 880, the IAM system 300 can display the simulated pathways or information on the determined over privileged access to a manager or administrator of the IAM system 300 using the user interface 350.

It should be obvious to one of ordinary skill in the art that subsets or combinations of various embodiments described above provide further embodiments. These and other changes can be made to the invention in light of the above-detailed description and still fall within the scope of the present invention. In general, in the following claims, the terms used should not be construed to limit the invention to the specific embodiments disclosed in the specification. Accordingly, the invention is not limited by the disclosure, but instead its scope is to be determined entirely by the following claims.

The invention claimed is:

1. A processor-executable method of identifying over-privileged access in a computing system, the method comprising:
   receiving configuration information for the computing system, the configuration information including information on roles that can be assumed by a computing resource or service of the computing system;
   selecting an identity that can access the computing system and determining access privileges for the selected identity using at least the received configuration information, the access privileges identifying one or more computing resource or service accessible to the selected identity;
   determining at least one role assumable by the identified one or more computing resource or service accessible to the selected identity based on the configuration information;
   determining whether the identified one or more computing resource or service accessible to the selected identity can (a) select a new role assumable by the identified one or more computing resource or service to access an additional resource or service based on the access privileges for the selected identity or the configuration information associated with the identified one or more computing resource or service, or (b) modify the determined at least one role to access an additional resource or service based on the access privileges for the selected identity or the configuration information associated with the identified one or more computing resource or service, or both (a) and (b);
   simulating access granted to the selected identity by the selected new role or the modified role to identify over-privileged access for the selected identity; and
   in a case where it is determined that the identified one or more computing resource or service accessible to the selected identity can elevate its privileges, providing notification of the identified over-privileged access to the computing system.

2. The method according to claim 1, wherein the computing system is a cloud computing system.

3. The method according to claim 1, wherein the configuration information further includes access privileges for one or more identities that can access the computing system.

4. The method according to claim 1, wherein the identity includes a role, a user, or a group.

5. The method according to claim 1, wherein the notification includes information on the new role assumable by the identified one or more computing resource or service, or the additional resource or service accessible by the selected identity based on the identified over-privileged access.

6. An identity and access management system that identifies over-privileged access in a computing system, the identity and access management system comprising:
   at least one memory configured to store instructions; and
   at least one processor communicatively connected to the at least one memory and configured to execute the stored instructions to:
      receive configuration information for the computing system, the configuration information including information on roles that can be assumed by a computing resource or service of the computing system;
      select an identity that can access the computing system and determine access privileges for the selected identity using at least the received configuration information, the access privileges identifying one or more computing resource or service accessible to the selected identity;
      determine at least one role assumable by the identified one or more computing resource or service accessible to the selected identity based on the configuration information;
      determine whether the identified one or more computing resource or service accessible to the selected identity can (a) select a new role assumable by the identified one or more computing resource or service to access an additional resource or service based on the access privileges for the selected identity or configuration information associated with the identified one or more computing resource or service, or (b) modify the determined at least one role to access a n additional resource or service based on the access privileges for the selected identity or configuration information associated with the identified one or more computing resource or service, or both (a) and (b);
      simulate access granted to the selected identity by the selected new role or the modified role to identify over-privileged access for the selected identity; and
      in a case where it is determined that the identified one or more computing resource or service accessible to the selected identity can elevate its privileges, provide notification of the identified over-privileged access to the computing system.

7. The system according to claim 6, wherein the computing system is a cloud computing system.

8. The system according to claim 6, wherein the configuration information further includes access privileges for one or more identities that can access the computing system.

9. The system according to claim 6, wherein the identity includes a role, a user, or a group.

10. The system according to claim 6, wherein the notification includes information on the new role assumable by the identified one or more computing resource or service, or the additional resource or service accessible by the selected identity based on the identified over-privileged access.

11. A non-transitory computer readable storage medium storing a program executable by a processor to perform a method of identifying over-privileged access in a computing system, the method comprising:

receiving configuration information for the computing system, the configuration information including information on roles that can be assumed by a computing resource or service of the computing system;

selecting an identity that can access the computing system and determining access privileges for the selected identity using at least the received configuration information, the access privileges identifying one or more computing resource or service accessible to the selected identity;

determining at least one role assumable by the identified one or more computing resource or service accessible to the selected identity based on the configuration information;

determining whether the identified one or more computing resource or service accessible to the selected identity can (a) select a new role assumable by the identified one or more computing resource or service to access an additional resource or service based on the access privileges for the selected identity or the configuration information associated with the identified one or more computing resource or service, or (b) modify the determined at least one role to access an additional resource or service based on the access privileges for the selected identity or the configuration information associated with the identified one or more computing resource or service, or both (a) and (b);

simulating access granted to the selected identity by the selected new role or the modified role to identify over-privileged access for the selected identity; and in a case where it is determined that the identified one or more computing resource or service accessible to the selected identity can elevate its privileges, providing notification of the identified over-privileged access to the computing system.

\* \* \* \* \*